| United States Patent [19] | [11] | 4,429,369 |
|---|---|---|
| Stanly et al. | [45] | * Jan. 31, 1984 |

[54] ELECTRO-OPTICAL PRINTER

[76] Inventors: Albert L. Stanly, 2285 W. Broadway, Anaheim, Calif. 92804; Gilbert P. Hyatt, P.O. Box 4584, Anaheim, Calif. 92803

[*] Notice: The portion of the term of this patent subsequent to Nov. 25, 1997 has been disclaimed.

[21] Appl. No.: 207,160

[22] Filed: Nov. 17, 1980

Related U.S. Application Data

[63] Continuation of Ser. No. 754,647, Dec. 27, 1976, Pat. No. 4,236,223.

[51] Int. Cl.³ .......................... G06F 3/12; G06K 15/12
[52] U.S. Cl. ......................................... 364/710; 355/18
[58] Field of Search .......... 364/710; 235/58 P, 61 PK; 219/209, 216; 355/18, 50, 52, 77, 132; 101/471, DIG. 13

[56] References Cited

U.S. PATENT DOCUMENTS

| 3,824,604 | 7/1974 | Stein ...................... 101/DIG. 13 X |
| 3,909,626 | 9/1975 | Balasubramanian et al. ...... 364/710 |
| 3,973,111 | 8/1976 | Washizuka et al. ............ 219/216 X |
| 3,975,742 | 8/1976 | Kelley ...................... 219/216 X |
| 3,976,975 | 8/1976 | Cockran ..................... 364/710 X |

OTHER PUBLICATIONS

"Calculator Firms Vie for Low End Printing Unit $"; by Kelley and Iscoff; Electronic News, Nov. 5, 1973; p. 32.
"Inexpensive Printers" by Elinoff; Electronic Products Magazine; Aug. 1978; pp. 43–48.
"New Digital Hard Copy Technologies"; by Dawes; Digital Design Magazine; Sep. 1979.
"Are Claims for Liquid Crystal Printing Fantasy or Reality", Digital Design Magazine; Apr. 1978.

*Primary Examiner*—Jerry Smith
*Attorney, Agent, or Firm*—Gilbert P. Hyatt

[57] ABSTRACT

An electro-optical printer is implemented with an electro-optical character generator in combination with an illumination sensitive medium such as photographic paper. This printer arrangement provides advantages such as being compatible with liquid crystal display devices used on conventional calculators and provides hard-copy printouts with a non-impact printer arrangement.

16 Claims, 7 Drawing Figures

ELECTRO-OPTICAL PRINTER

CROSS-REFERENCE TO RELATED APPLICATIONS

This application is a continuation of parent application Electro-Optical Printer by Stanly and Hyatt Ser. No. 754,647 filed on Dec. 27, 1976 now U.S. Pat. No. 4,236,223 issued on Nov. 25, 1980 and copending herewith; where said parent application is herein incorporated by reference and where the benefit of the filing date of said parent application is herein claimed in accordance with 35 USC 120, 35 USC 121, and other authorities provided therefor.

This application is related to application Illumination Control System Ser. No. 366,714; filed on June 4, 1973; by Gilbert P. Hyatt now U.S. Pat. No. 3,986,022 issued on Oct. 12, 1976 and application Electro-Optical Illumination Control System; Ser. No. 730,756; filed on Oct. 7, 1976; by Gilbert P. Hyatt; now abandoned in favor of continuing applications wherein these applications are herein incorporated-by-reference as if fully set forth at length herein.

BACKGROUND OF THE INVENTION

1. Field of the Invention

The present invention is related to digital printers.

2. Description of the Prior Art

The prior art provides many different types of printer devices such as characterized by the art of record herein. These printers are relatively large and expensive and do not lend themselves to low-cost consumer applications such as for electronic calculators. Therefore, prior art low-cost electronic calculators have only operator displays but do not have hard-copy printers. The prior art is further described in the references cited in this case.

SUMMARY OF THE INVENTION

The present invention provides a simple, inexpensive, and portable digital printer system for use in products such as low-cost electronic calculators. It may be implemented as a character printer, as a line printer, and as a page printer as a compromise between speed and cost. The printer of the present invention may utilize conventional liquid crystal display (LCD) characters which are commonly used in the prior art for operator displays. Such display-type LCD characters may be illuminated to selectively expose an illumination sensitive medium for recording or photographically printing the illuminated characters. Exposure may be provided with a contact print arrangement or with a projection (focused image) print arrangement depending upon the application.

An objective of the present invention is to provide a low-cost and portable hard-copy recorder.

A further objective of the present invention is to provide a low-cost and portable printer system.

A still further objective of the present invention is to provide a printer that is compatible with electronic displays.

The foregoing and other objects, features, and advantages of the present invention will become apparent from the following detailed description of the preferred embodiments of this invention, as illustrated in the accompanying drawings.

BRIEF DESCRIPTION OF THE DRAWINGS

A further understanding of the invention may be had from consideration of the detailed description hereinafter taken in conjunction with the drawings described below.

DETAILED DESCRIPTION OF THE PRESENTLY PREFERRED EMBODIMENT

The system of the present invention represents a basic teaching in the printer art, providing exposure of an illumination sensitive medium for recording digital information under control of an electro-optical device. For simplicity of discussion, the general teachings of the present invention will be discussed in the presently preferred embodiment of a printer for an electronic calculator using liquid crystal display (LCD) image generators.

Figure 1:
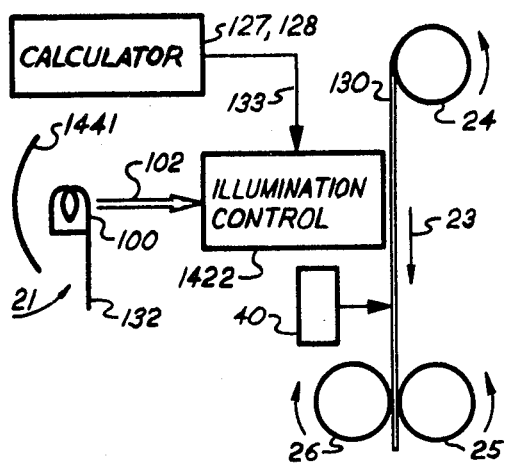
FIG. 1 is a block diagram representation of a printer in accordance with the present invention.

A preferred embodiment of the printer is shown in FIG. 1, which is related to FIG. 1 of the referenced Illumination Control System patent. An illumination source 100 generates illumination 102 to illuminate illumination control device 1422 to illuminate the illumination sensitive medium 130. Source 100 may be used with a reflector 1441 to concentrate illumination 102 toward medium 130. Control device 1422 may operate in response to signals 133 from a command and control device 127, 128 which may be a well-known prior art calculator such as model 2230 manufactured by Litronix, Inc of Cupertino, Calif. Illumination sensitive medium 130 may be transported past illumination control device 1422 with well-known paper or film handler devices. For example, film 130 may be stored on roll 24 and may be transported past control device 1422 as shown with arrow 23 with capstan 25 and idler wheel 26. Film transport mechanism 24-26 may be controlled to transport an exposed portion past control device 1422 and to stop for exposure of a new unexposed portion or may be controlled to drive continuously. Such drive mechanisms are well known in the art such as for paper feeds and in magnetic tape cassette recorders for tape drives. Source 100 may be a well-known flash tube such as a xenon flash tube to provide a rapid illumination strobe to rapidly expose medium 130 in order to mitigate the effects of motion such as blurring of images. Control electronics for xenon flash tubes and other illumination sources are well known in the art. Alternately, a pulse modulated control is discussed in the referenced Illumination Control System patent relative to FIG. 2 therein which may be used for controlling source 100. Alternately, source 100 may be continuously excited and exposure may be accomplished by controlling electro-optical device 1422, as discussed in the referenced Illumination Control System patent relative to FIGS. 8 and 9 therein for electro-optical shutters and apertures. In this electro-optical shutter embodiment, electro-optical device 1422 may be controlled to be reflective (assuming a transmissive mode of operation) until medium 130 is in printing position and then the selected electro-optical segments may be controlled to be transmissive for printing of those segments on medium 130.

Electro-optical device 1422 controls input illumination 102 to selectively expose medium 130 at the appropriate time. Strobing of the printing operation can be performed with pickoffs on the mechanical elements of the medium feed in the manner conventionally used with hammer-type impact line printers such as manufactured by Data Products Corporation of Woodland Hills, Calif. Electro-optical device 1422 may be a single character printer, a line printer, or a page printer; wherein prior art single character printers are exemplified by a conventional typewriter and prior art line printers are exemplified by Data Products Corporation impact line printers. Strobing of the printing operation may be performed with conventional techniques such as used with the Teletype Corporation ASR-33 printer as a character printer and said Data Products Corporation printer as a line printer. In direct contrast to those prior art mechanical printers, character selection for the printer of the present invention is performed electro-optically rather than mechanically.

In addition, source 100 may be electronically controlled with control signal 132. This control signal may be generated from an illumination feedback transducer signal or other control signal as discussed in the referenced copending applications.

Electro-optical formation of characters to be printed are well known in the display art, although they are not well known in the printing art. For example, LCDs and LCD command devices are widely used with electronic watches, panel meters, calculators, and other display devices where the LCDs and related LCD command devices may be used to implement and to command illumination control 1422 of the present invention. One such well-known prior art display arrangement is briefly discussed with reference to FIG. 2 hereinafter.

Illumination 102 processed with control 1422 exposes medium 130 as it is transported with transport mechanism 24–26. Illumination sensitive medium 130 may be any well-known medium but in a preferred embodiment it is illumination sensitive recording paper such as used in conjunction with recording oscillographs of the VISICORDER type provided by Honeywell Test Instruments Division in Denver, Colo. and other such optical oscillograph-type recorders. Such oscillograph recording medium has particular advantages in that it may be used with ambient lighting and does not need a darkroom nor a cartridge, nor camera enclosure for controlling exposures. Alternately, medium 130 may be photographic film which may be used in conjunction with conventional camera devices for controlled exposures independent of ambient illumination conditions. In other embodiments, medium 130 may be infrared or thermal sensitive, may be ultra-violet sensitive, or may be other sensitive devices.

Priner 21 may provide a primary exposure with source 100 and a secondary exposure with source 40. The primary exposure may be performed at a relatively higher intensity with a source such as a xenon, mercury vapor, or fluorescent lamp for exposing medium 130 with a character. The secondary exposure may be performed at a lower intensity with a lamp such as a fluorescent lamp for photodeveloping medium 130.

In another embodiment, medium 130 may be a thermal developing medium such as Kodak type Ektamate 150 using thermal developing device 40 to thermally develop medium 130. Developing device 40 may be a heater element, a heated medium guide, a heated plenium chamber, or other such arrangement. Alternately, medium drive devices such as capstan 25 and wheel 26 may be heated such as with a heater element 25 for photodeveloping medium 130.

Figure 2:
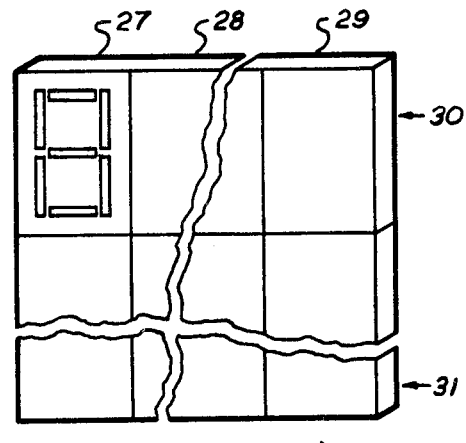
FIG. 2 is a diagram of a liquid crystal multiple-element segment display that may be used in accordance with the present invention.

Control device 1422 may include an electro-optical character generator 104 such as the liquid crystal display (LCD) 104 shown in FIG. 2. LCD 104 may include a single character 27 to implement a character printer, may include a line 30 of a plurality of characters 27–29 to implement a line printer, or may include a plurality of lines of characters 30 and 31 to implement a multiple-line printer or a page printer. Each character may be implemented as a conventional display such as a seven-segment display shown as character 27. Other character display arrangement such as alpha-numeric segment display arrangements are well known in the art and may also be used to implement control 142. Characters may be sequentially excited such as controlled with well-known display refresh electronics or may be all excited simultaneously for a parallel printing operation such as controlled with well-known constant excitation display electronics.

Because electro-optical device 104 may be similar to, if not identical to, a well-known liquid crystal display; the visual display itself may be used to provide the dual function of display to an operator and printing on an illumination sensitive medium. Alternately, redundant electro-optical devices may be used wherein a first electro-optical device may be used as an operator display and a second electro-optical device may be used for exposing illumination sensitive medium 130; where both the display and the exposing electro-optical devices may be controlled from the same control device and/or with the same control signals or both. Therefore, the compatibility of the electro-optical device in the printer of the present invention with the prior art electro-optical display devices provides advantages of compatibility and interchangeability. Alternately, different types of display and printing elements may be used wherein the display element may be a well-known light-emitting diode display and the printing element may be an LCD element as discussed with reference to FIGS. 1–6 above.

Figure 3:
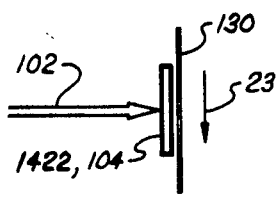
FIG. 3 is a diagram of a contact print embodiment of the present invention in accordance with FIG. 1.

A contact print embodiment will now be described with reference to FIG. 3. Illumination 102 from source 100 may be used to illuminate electro-optical device 1422 which may be controlled to provide alpha-numeric character images. Character images from electro-optical device 104 may be contact printed on medium 130 with exposing device 104 as medium 130 is transported past device 104 in the direction of arrow 23. Illumination 102 may be diffused or otherwise optically preprocessed to provide the desired uniformity and illumination density across device 104. This contact print embodiment represents a presently preferred embodiment because of the simplicity of contact printing compared to projection printing.

Figure 4:
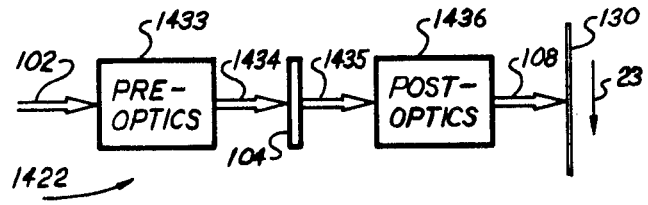
FIG. 4 is a diagram of a projection embodiment of the present invention in accordance with FIG. 1.

A projection illumination control embodiment will now be described with reference to FIG. 4. Illumination 102 from source 100 may be processed with first processing optical devices 1433 such as accumulating lenses to provide preprocessed illumination 1434 to illuminate electro-optical device 104. Electronic control of device 104 permits selected segments to form digital character illumination images with controlled illumination 1435 which may be focused with second processing optics 1436 to generate postprocessed illumination 108 for exposing medium 130, transported in the direction shown with arrow 23. Postprocessing optics 1436 may include focusing lenses to focus the image to be printed on medium 130.

Figure 5:
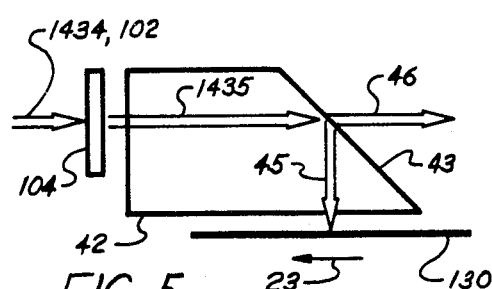
FIG. 5 is a diagram of a combination display and printing embodiment of the present invention in accordance with FIG. 1.

A combination printing and display arrangement consistent with the contact printing embodiment described with reference to FIG. 3 and the projection printing embodiment described with reference to FIG. 4 will now be described with reference to FIG. 5. Illumination 102 from source 100 or illumination 1434 from optics 1433 may be formed into character images with LCD 104 as discussed above. Illumination image 1435 may be processed with beam splitter 42 which may be included in optics 1436 (FIG. 4). Beam splitters are well known in the art and may be formed as a prism 42 with a half-silvered surface such as surface 43. Illumination 1435 having character images impressed thereon may be transmitted through optic device 42 to beam splitter surface 43 to generate transmitted image 46 and reflected image 45. Transmitted image 46 may be used for display purposes such as by illuminating a frosted glass screen which may be surface 43 of optics 42 formed in frosted form or which may be a separate projection screen illuminated by image 46. Reflected image 45 may be used for printing on medium 130 which may be transported as shown with arrow 23; as discussed with reference to FIGS. 1-4 above. Alternately, reflected image 45 may be used for display and transmitted image 46 may be used for printing.

Still further, beam splitter 42 may be electronically controlled such as by implementing surface 43 as a liquid crystal device which may be controlled to be reflective for printing, or to be transmissive for display, or to be partially reflective and partially transmissive for combinations of printing and display; wherein partial and full reflectivity and transmissivity are disclosed in the referenced patent Illumination Control System.

Well-known prior art devices may be used in various combinations to implement the preferred embodiments of the present invention. For example, source 100, photodeveloper lamp 40, medium 130, medium feed 24-26 and projection optics 1433 and 1436 may be implemented as provided in the Honeywell VISICORDER product; command and control devices 127 and 128 and LCD character generators 27 and 104 may be implemented as provided in display calculators, LCD digial watches, LCD panel meters, and other well-known display devices; illumination sensitive medium 130 may be Kodak direct print photodeveloping paper type 2167 or type 2295 or thermal developing paper type Ektamate 150. Thermal developing may be performed with well known heater elements such as resistance heaters, gas heaters, etc and thermal developing may be performed by passing medium 130 over a conduction surface such as a guide, capstan, or roller; through a convection heating region, or through a radiation heating region; by illuminating and simultaneously heating with radiation such as infrared illumination; and may be other well-known means and methods for heating.

A preferred character generation arrangement will now be discussed with reference to FIGS. 1, 6A, and 6B. As discussed above, medium 130 is transported past illumination control 1422 for exposure, where medium 130 may be exposed while moving in the direction off arrow 23 or may be stopped for exposure. In the moving exposure embodiment, the characters may become smeared by motion of the medium, which smearing is generally considered by the art to be detrimental and undesirable. In accordance with another feature of the present invention, a character generator is provided that utilizes this smearing effect to facilitate proper character printing.

The prior art method may be characterized as spacial-domain printing where the character is completely defined in the two-dimensional plane of the character generator and paper and where the instant feature of the present invention may be characterized as time-domain printing where the character is not completely defined in the spacial-domain but is dependent upon time, the smearing effect, and/or motion of the medium to properly form the character.

Figure 6A:
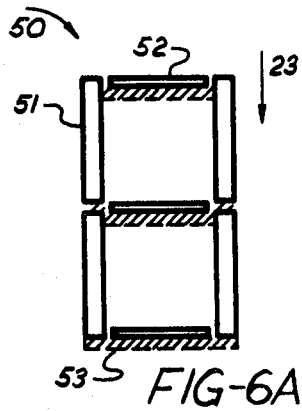
FIG. 6 comprises FIG. 6A showing a preferred embodiment of a printing character and FIG. 6B showing alphanumeric printing characters.
Figure 6B:

A seven-segment alphanumeric character is illustrated in FIG. 6A and ten numeric characters and several alphabetical characters are illustrated in FIG. 6B which are formed from the alphanumeric character of FIG. 6A in accordance with the time-domain character generation feature of the present invention. These characters have relatively wide segments 51 parallel to the direction of motion (vertical in FIGS. 6A and 6B) and have relatively thin segments 52 across or perpendicular to the direction of motion (horizontal in FIGS. 6A and 6B); where motion is depended upon to increase the width of thin segments without increasing thickness of thick segments 51 parallel to the direction of motion. Conventional segments are separated by spaces such as the seven-segment character 27 (FIG. 2). For convenience of illustration, the character segments in FIG. 6 are not shown with such spaces. Nevertheless, an actual embodiment may implement alphanumeric character 50 (FIG. 6A) and characters 54 (FIG. 6B) having segments with spaces therebetween or with other well-known formats.

Alphanumeric character 50 is printed by exposing illumination sensitive medium 130 as medium 130 is moved in the direction shown by arrow 23 (FIG. 1 and FIG. 6A). As medium 130 is moved past character 50 in the direction of arrow 23, segments perpendicular to the direction of motion (horizontal segments) such as segment 52 may be smeared in the direction of motion 23 as shown by the crosshatched symbol in FIG. 6A to the position illustrated with the dashed lines such as dashed line 53. Segments parallel to the direction of motion (vertical segments) such as segment 51 may not be smeared to an appreciable degree, although there may be some degree of smearing of segments parallel to the direction of motion such as indicated in the bottom of segment 53.

The width of horizontal segments 52 may be determined by the amount of smearing that will occur due to motion 23 during the exposure period. For example, if the exposure period and the velocity of motion caused a smearing of three-quarters of the width of a vertical segment 51 during an exposure period, then horizontal segments 52 need only have a width of one-quarter the width of the vertical segments because the other three quarters of the width will be exposed as a function of the smearing effect due to motion 23. The faster the motion 23 and the longer the exposure time, the wider will be the exposed horizontal segments 52.

The smeared horizontal segments 52 have a lower exposure than the unsmeared vertical segments 51 because horizontal segments 52 are only exposed for a portion of the exposure period due to the motion 23 and the resulting smearing effect while vertical segments 51 receive higher levels of exposure because of the substantially continuous exposure during the complete exposure period. Because of the relatively high exposure intensity levels and because latitude or shades of grey need not be implemented, even the low exposure of horizontal segments 52 may be substantially indistringuishable from the higher level exposures of vertical segments 51.

Alphanumeric characters may be formed with the single alphanumeric character type shown in FIG. 6A. Ten numeric characters 0 to 9 and several alphabetical characters A, B, I, and O are shown in FIG. 6B; where vertical segments are shown wider than horizontal segments. Exposure of such characters using time-domain techniques described above will cause the width of horizontal segments to be increased from the width shown for the characters in FIG. 6B.

In view of the above, a time-domain character generator may be provided in place of the prior art spacial-domain character generator wherein the time-domain character generator makes use of the smear effect due to motion of the medium in contrast to prior art character generators wherein the smearing effect is considered to be detrimental. The time-domain character generator has many advantages such as reducing the effect of smearing of characters and facilitating printing on the fly while the medium is in motion.

Because of the flexibility of the illumination printing feature of the present invention, many different printing alternatives now become available. For example, medium 130 may be continuously moved past printing illumination 108 for higher speed operation such as with a computer printout device using the time-domain printing arrangement. The liquid crystal device may be controlled to first form characters for exposure and then to become a shutter for non-exposure between lines of printed information. Alternately, medium 130 may be stopped at each line, such as for intermittent printing as with a desk-top calculator using spacial-domain characters and the illumination amplifier shutter of U.S. Pat. No. 3,986,022. Alternately, the continuous motion arrangement may be used in combination with a high intensity illumination source and a short printing period to minimize smearing using spacial-domain characters.

In accordance with another feature of the present invention, illumination source 100 (FIG. 1) may provide both exposure illumination and developing energy. For example, medium 130 may be a thermal developing medium which is conventionally believed to require illumination for exposure and heat for developing. It has been found that illumination source 100 may provide both exposure and developing energy. For example, a high intensity source 100 may be used to "burn in" the characters with high intensity illumination for exposing medium 130. Alternately, heat generated by source 100 may be used to heat the environment of medium 130 such as the structure or the air for thermal developing with energy from illumination source 100.

Another feature of the present invention may be characterized as a display-before-print feature. Because of the well-known nature of microprocessor technology, the use of microprocessors in desk-top calculators, the use of displays in desk-top calculators, and the use of printing mechanisms in desk-top calculators; the display-before-print capability can be implemented from the discussion thereof hereinafter.

Another feature of the present invention provides the combination of a display and a printer in the same system. This permits an operator to view output information before printed information is visually available such as where the case obscures the most recently printed information. Also, information may be displayed before printing to facilitate detection and correction of errors. In one embodiment, output information may be displayed after being processed without being printed. The operator may be required to separately command printing such as with a special print command key on the keyboard or alternately by depression of a function command key on the keyboard. A buffer memory may be used to store information not yet printed for subsequent printing with the appropriate operator command. In use, an operator may enter information from the keyboard; visually verify the information on the display; then depress a key such as a print key, a function key, or other key for printing after the displayed information has been verified to be correct. If an error were detected, the error may be corrected as provided with prior art display calculators. Correct information could be printed by depression of the appropriate key. For example, a clear key may be used to clear an erroneous display without printing and a function key such as plus, minus, multiply, or divide may be used to print the properly displayed information.

The display-before-print feature of the present invention may be implemented with a shutter arrangement for controlling printing and displaying. Alternately, separate character generators may be provided for independent printing and display. As shown in FIG. 5, surface 43 may be a liquid crystal shutter surface which controls whether illumination 1435 is transmitted for display as illumination 46 or for printing as illumination 45. Device 43 may be controlled for either display or printing, or for display only, or for display and printing such as with fully transmissive and partially transmissive surface 43.

Several techniques for providing thermal developing will now be discussed. In one embodiment, radiant heating may be provided such as radiant energy from illumination source 100. In another embodiment, a transparent heating element may be provided such as with conduction heating from a heating element, wherein the transparent heating element may permit viewing of the printed characters as they are being thermally developed. Alternately, the back side of medium 130 may be heated with an opaque heating element either in place of or in addition to a transparent heating element. Temperature control may be provided with a temperature transducer and a temperature controller for controlling a heating element as is well known in the art. The transducer may sense the temperature of one of the heating surfaces or alternately may be in contact with the printing medium and may sense temperature of the printing medium as it is being thermally developed.

Alternately, a ratchet-type arrangement for paper feeding with a paper push plate may be provided, wherein the push plate used to move the paper may also be heated with a heating element to provide for thermal developing during paper feed operations. In another embodiment, a resistive medium such as graphite impregnated illumination sensitive paper may be heated resistively by applying a voltage across the paper for thermal developing.

In one embodiment, a single illumination source may be provided for both illumination printing and either photodeveloping or thermal-developing. In an alternate embodiment, a single source may illuminate the printing arrangement along a first illumination path for printing operations and may illuminate the medium along a second illumination path for photo-developing or thermal-developing such as by using light-pipe elements to conduct illumination. In this embodiment, a light pipe may be an illumination transmissive and conductive medium such as lucite or a thermal conductive medium such as copper to conduct light or heat energy respectively. For example, illumination may be separately conducted along a first path for printing and along a second path for photo-developing with fiber optic or lucite light pipes. The two paths may be different therebetween, where one path may conduct a higher intensity illumination than the other path such as for higher intensity for printing and lower intensity for developing or conversely lower intensity for printing and higher intensity for developing.

The environment for the printer systems of the present invention is discussed in greater detail in the copending patent application Illumination Control System which is herein incorporated-by-reference. Although the pertinence thereof will be readily apparent from the context of the instant application and the context of said copending application, the more pertinent aspects with reference to the figures of said copending application and with the text related to said figures will be briefly discussed hereinafter.

FIG. 1 of said copending application shows command device 127, which may be a microcomputer in an electronic calculator, generating command signal 126 to command signal processor 128, which may be control electronics, to generate control signal 132 to control illumination source 100 for illuminating electro-optical device 104 with controlled illumination 102. Segment control signals for the LCD may be signals 133 to illumination amplifier 104 which may be an electro-signal character generator. Illumination 108 having the character image impressed thereon exposes illumination sensitive medium 130 in receiver 112. Illumination feedback may be provided with feedback transducer 134 and feedback signal processors 116.

FIG. 2 of said copending application shows generation of control signal for electro-optical devices with gates 210 or SCRs 216 using segment control signals 212 and 218 respectively. Alternately, computer 251 may control segments either in a feedback arrangement as discussed for FIG. 2C or without feedback. Pulse modulation may be used, as shown in FIGS. 2B and 2D therein.

FIGS. 3-7 of said copending application show specific applications wherein the text related thereto provides alternate embodiments to the printer embodiment discussed herein.

FIG. 8 of said copending application shows segment control of illumination for exposing an illumination sensitive medium and therefore is directly applicable to the segment control and medium exposure of the present invention.

FIGS. 9 and 10 of said copending application provide camera systems for exposing an illumination sensitive medium wherein the printing arrangement of the present invention may be configured in the form of a camera system, particularly for the projection embodiment discussed with reference to FIG. 4 herein.

FIG. 11 of said copending application provides a segment control arrangement which is applicable to the control of electro-optical segments of the printer of the present invention.

Elements 1422, 1433-1436, and 1441 are described in greater detail in copending patent application Electro-Optical Illumination Control System particularly at FIG. 14 therein, herein incorporated-by-reference.

In view of the above, the disclosures in said copending applications are directly applicable to the system of the instant invention and provide a detailed basis for the inventive features discussed herein.

In view of the above, it can be clearly seen that the present invention provides a novel means and method for printing digital information such as for use in an electronic calculator.

From the above description it will be apparent that there is thus provided a device of the character described possessing the particular features of advantage before enumerated as desirable, but which obviously is susceptible to modification in its form, proportions, operation, detailed implementation and arrangement of parts without departing from the teachings of the present invention.

In order to comply with the statute, the invention has been described in specific language related to a preferred embodiment. It is intended that the invention not be limited to the specific features shown, but that the means, method, construction herein disclosed comprise the preferred form of several modes of putting the invention into effect and the invention is, therefore, claimed in all of its forms within the legitimate and valid scope of the appended claims.

What we claim is:

1. A printer system for printing digital information, said printer system comprising:
   command means for generating electrical command signals related to digital information to be printed;
   an illumination source for generating illumination;
   illumination controlling means for generating controlled illumination by controlling transmission of the illumination from said illumination source in response to the command signals;
   means for projecting the controlled transmitted illumination from said illumination controlling means onto an illumination sensitive medium; and
   means for printing digital information by exposing an illumination sensitive medium in response to the controlled illumination from said illumination controlling means.

2. The system as set forth in claim 1 above, wherein said illumination controlling means includes a plurality of segments for exposing said illumination sensitive medium with a digital character.

3. The system as set forth in claim 2 above, wherein said printing means includes means for transporting and illumination sensitive medium past said illumination controlling means to sequentially expose said illumination sensitive medium with a plurality of the digital characters.

4. The system as set forth in claim 1 above, wherein said printing means includes means for providing contact exposure of an illumination sensitive medium.

5. The system as set forth in claim 1 above, wherein said projecting means includes means for providing projection exposure of an illumination sensitive medium.

6. The system as set forth in claim 1 above, wherein said command means includes means for calculating numerical solutions and wherein said printer system provides hard-copy output for the calculated numerical solutions.

7. The system as set forth in claim 1 above further comprising an operator display for displaying numerical information in response to the command signals.

8. The system as set forth in claim 1 above, wherein said illumination source includes means for generating the illumination as visible illumination.

9. The system as set forth in claim 1 above, wherein said illumination source includes means for generating the illumination as infra-red illumination.

10. The system as set forth in claim 1 above, wherein said illumination source includes means for generating the illumination as coherent illumination.

11. The system as set forth in claim 1 above, wherein said illumination source includes means for generating the illumination as ultra-violet illumination.

12. The system as set forth in claim 1 above, wherein said command means includes pulse modulation means for generating the electrical command signals as pulse modulated electrical command signals.

13. The system as set forth in claim 1 above, further comprising feedback means for controlling the controlled transmitted illumination from said projecting means.

14. A numerical recording system comprising:
an electronic calculator for generating an output signal in response to numerical calculations;
liquid crystal means for generating at least one numerical character illumination image in response to the output signal; and
exposing means for contact exposing an illumination sensitive chemical medium in response to the illumination image.

15. The system as set forth in claim 14 above further comprising display means for displaying a numerical character in response to the output signal.

16. The system as set forth in claim 14 above further comprising means for displaying the illumination image.

* * * * *